United States Patent
Sethi et al.

(10) Patent No.: US 12,237,967 B2
(45) Date of Patent: Feb. 25, 2025

(54) METHOD TO PROVIDE DISASTER RECOVERY WITH REVERSE PROXY ACROSS GEOGRAPHICALLY DISTRIBUTED DATA LAKES

(71) Applicant: Dell Products L.P., Round Rock, TX (US)

(72) Inventors: Parmnder Singh Sethi, Punjab (IN); Anay Kishore, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 221 days.

(21) Appl. No.: 18/169,792

(22) Filed: Feb. 15, 2023

(65) Prior Publication Data
US 2024/0275797 A1 Aug. 15, 2024

(51) Int. Cl.
| | |
|---|---|
| *H04L 41/0663* | (2022.01) |
| *H04L 41/044* | (2022.01) |
| *H04L 41/0659* | (2022.01) |
| *H04L 41/0893* | (2022.01) |
| *H04L 43/0805* | (2022.01) |
| *H04L 43/10* | (2022.01) |

(52) U.S. Cl.
CPC ........ *H04L 41/0663* (2013.01); *H04L 41/044* (2013.01); *H04L 41/0661* (2023.05); *H04L 41/0893* (2013.01); *H04L 43/0805* (2013.01); *H04L 43/10* (2013.01)

(58) Field of Classification Search
CPC . H04L 5/0055; H04L 41/044; H04L 41/0661; H04L 41/0663; H04L 41/0893; H04L 43/0805; H04L 43/10
See application file for complete search history.

(56) References Cited

U.S. PATENT DOCUMENTS

| | | | |
|---|---|---|---|
| 7,590,981 B2 | 9/2009 | Gupta et al. | |
| 8,078,448 B1 | 12/2011 | Wohlberg et al. | |
| 11,846,918 B1 | 12/2023 | Mazur | |
| 2011/0113224 A1 | 5/2011 | Isshiki et al. | |
| 2013/0246623 A1 | 9/2013 | Seth | |
| 2015/0023213 A1* | 1/2015 | Soneda | H04L 45/20 370/254 |
| 2015/0278219 A1 | 10/2015 | Phipps | |
| 2016/0162280 A1 | 6/2016 | Murayama et al. | |

(Continued)

FOREIGN PATENT DOCUMENTS

| | | | | |
|---|---|---|---|---|
| JP | 2004349772 A | * | 12/2004 | .......... H01M 50/308 |
| JP | 2017027496 A | | 2/2017 | |

*Primary Examiner* — Boris D Grijalva Lobos
(74) *Attorney, Agent, or Firm* — Aly Z. Dossa; Chamberlain, Hrdlicka, White, Williams & Aughtry

(57) ABSTRACT

Embodiments described herein relate to methods, systems, and non-transitory computer readable mediums storing instructions for maintaining application instances or contexts across a plurality of geographically distributed nodes. These applications may take the form of web applications and/or databases that are exposed to the Internet and/or other unsecured networks. In order to prevent the loss of these applications due to cyber-attacks or due to day-to-day hardware and/or software failures, an alpha node is established and the remaining nodes are established as beta nodes. When any node goes down one or more embodiments of the invention allow for the orderly and continued operation of the remaining nodes.

20 Claims, 7 Drawing Sheets

(56) References Cited

U.S. PATENT DOCUMENTS

2018/0113728 A1    4/2018    Musani et al.
2019/0199687 A1    6/2019    Lan
2019/0310872 A1    10/2019    Griffin
2019/0386849 A1    12/2019    Yu
2020/0156243 A1    5/2020    Ghare et al.

* cited by examiner

METHOD TO PROVIDE DISASTER RECOVERY WITH REVERSE PROXY ACROSS GEOGRAPHICALLY DISTRIBUTED DATA LAKES

BACKGROUND

In an enterprise environment, a system might be running multiple applications that are either working together or dependent on each other. When an application that is working with multiple other applications experiences downtime or other difficulties, it may affect all of the applications that are dependent on it. Many databases, applications, and web services are exposed to the Internet and the resulting cyberattacks. When the databases and/or web services are attacked or experience downtime due to other issues, current systems and methods may result in significant down time and/or loss of critical data. Unexpected downtime may result in decreased performance or complete failure of applications.

SUMMARY

In general, embodiments described herein relate to a method for performing disaster recovery across a plurality of geographically dispersed nodes. The method initially records the order that each of the plurality of nodes are established in one or more databases stored with each of the plurality of nodes. The first node to be established is designated as an alpha node with each of the remaining nodes designated as beta nodes. The alpha node periodically receives from each of the one or more beta nodes a status signal. In response to the alpha node determining that a beta node did not send a status signal, the alpha node performs actions to attempt to restore that beta node, notifies a user when the actions do not restore the beta node, and the alpha node also updates the order that each of the plurality of nodes was established to not include the beat node. Then the alpha node sends an acknowledgement signal to the remaining nodes with includes the updated order. The remaining beta nodes store the updated order in their one or more databases.

In general, embodiments described herein relate to a non-transitory computer readable medium comprising computer readable program code. The computer readable code, which when executed by a computer processor, enables the computer processor to perform a method for performing disaster recovery across a plurality of geographically dispersed nodes. The method initially records the order that each of the plurality of nodes are established in one or more databases stored with each of the plurality of nodes. The first node to be established is designated as an alpha node with each of the remaining nodes designated as beta nodes. The alpha node periodically receives from each of the one or more beta nodes a status signal. In response to the alpha node determining that a beta node did not send a status signal, the alpha node performs actions to attempt to restore that beta node, notifies a user when the actions do not restore the beta node, and the alpha node also updates the order that each of the plurality of nodes was established to not include the beat node. Then the alpha node sends an acknowledgement signal to the remaining nodes with includes the updated order. The remaining beta nodes store the updated order in their one or more databases.

In general, embodiments described herein relate to a system comprising a plurality of geographically dispersed nodes. The geographically dispersed nodes include at least one firewall, at least one reverse proxy, at least one processor and at least one memory. The memory includes instructions, which when executed by the processor perform a method for performing disaster recovery across a plurality of geographically dispersed nodes. The method initially records the order that each of the plurality of nodes are established in one or more databases stored with each of the plurality of nodes. The first node to be established is designated as an alpha node with each of the remaining nodes designated as beta nodes. The alpha node periodically receives from each of the one or more beta nodes a status signal. In response to the alpha node determining that a beta node did not send a status signal, the alpha node performs actions to attempt to restore that beta node, notifies a user when the actions do not restore the beta node, and the alpha node also updates the order that each of the plurality of nodes was established to not include the beat node. Then the alpha node sends an acknowledgement signal to the remaining nodes with includes the updated order. The remaining beta nodes store the updated order in their one or more databases.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
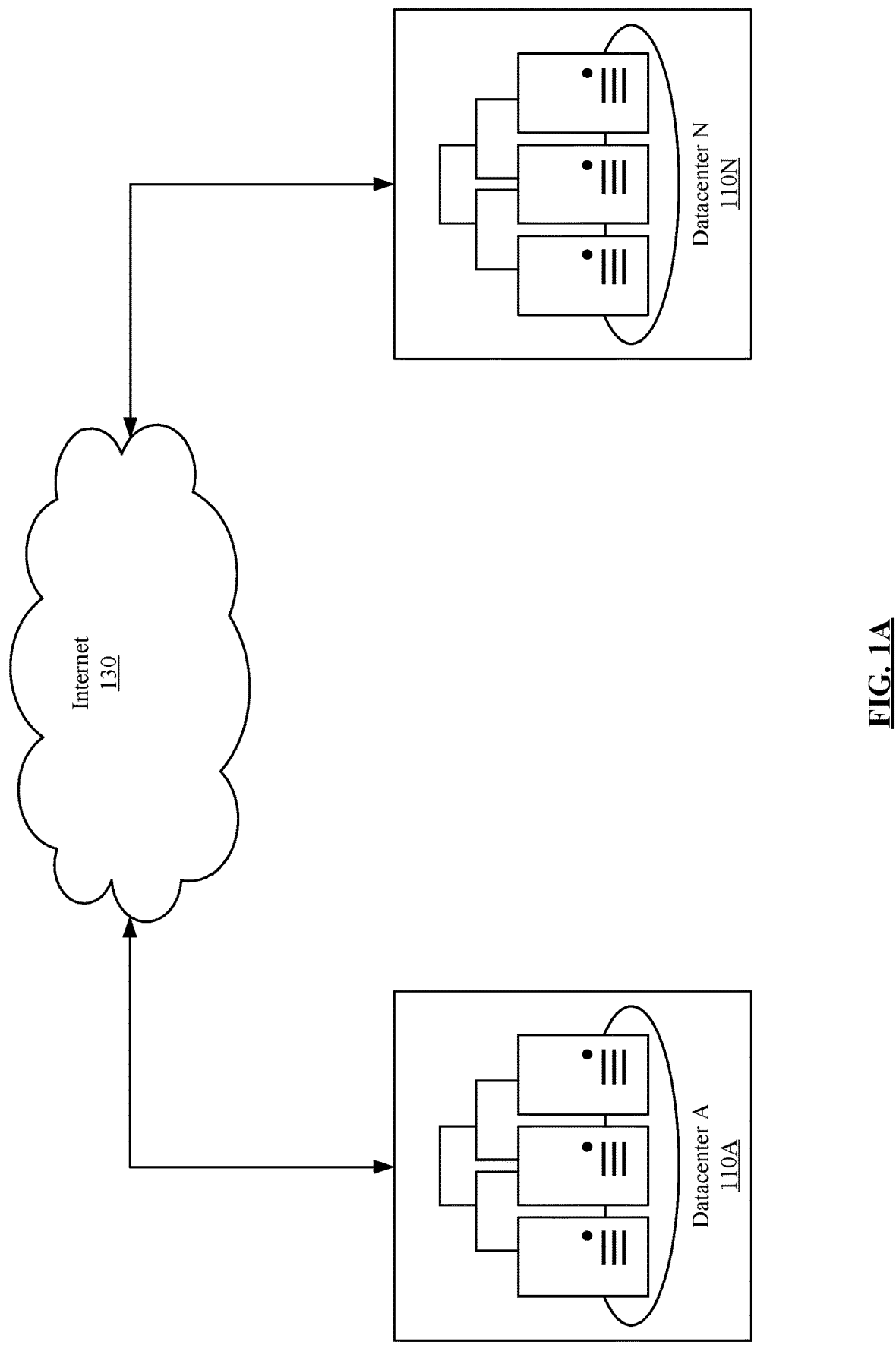
FIG. 1A shows a diagram of a system in accordance with one or more embodiments of the invention.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regards to a figure, in various embodiments described herein, may be equivalent to one or more like-named components described with regard to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for maintaining application instances or contexts across a plurality of nodes located on geographically distributed datacenters including those functioning as one or more data lakes. These applications may take the form of web applications and/or databases that are exposed to the Internet. In order to prevent the loss of these applications due to cyber-attacks or due to day-to-day hardware and/or software failures, multiple instances of the applications are maintained as a plurality of nodes that are protected by firewalls and at least one reverse proxy.

Previous methods of data protection did not provide a sufficient method or intelligence to perform quick and reliable disaster recovery. Most databases and web services including applications, were exposed to the Internet directly with only the protection of a single firewall and/or without any protection at all. Further only one or two instances of the databases, web services, and application would be available with limited failover capabilities. When the databases, web services, and/or applications were attacked, due to a lack of duplication and intelligence, when these services, applications, and/or databases failed there would be significant down time and/or loss of critical data.

One or more embodiments of the present invention seek to provide better protection and prevent down-time and/or loss of critical data by providing the applications, web services and/or database on multiple nodes that are geographically distributed as well as protected behind both firewalls and one or more reverse proxies.

One or more embodiments of the present invention includes intelligence that allows for establishing an alpha node that coordinates the other (beta) nodes. When one or more beta nodes is taken down, the other nodes are made aware and may continue to provide the services of the beta nodes that are down. Further, if the alpha node goes down a seamless intelligence allows for the establishment of a new alpha node without interruption of service. This and other improvements allow the one or more embodiments of the invention allows for a secure disaster recovery method that insure that even if one or more datacenters and/or nodes are attacked, the remaining datacenters and/or nodes may continue to provide services while the attacked datacenters and/or nodes are repaired. Further with the help of firewalls and reverse proxies, further security is provided.

FIG. 1A shows a diagram of a system that performs the claimed methods in one or more embodiments of the invention. The system includes a plurality of datacenters (e.g., 110A-110N) which are connected to each other through a network such as the Internet (e.g., 130). For simplicity, the system shown in FIG. 1A only shows two datacenters (e.g., 110A-110N), however, they are only representative, and a subset of the system and the system may include any number of datacenters that are geographically dispersed (for example, in a non-limiting example one or more located on each continent). Further, in one or more embodiments of the invention, one or more datacenters may be located at the same facility and/or one or more datacenters located remotely in other locations that are geographically dispersed.

In one or more embodiments of the invention, the one or more datacenters (e.g., 110A-110N) may take the form of or host a data lake. A data lake is a system or repository of data and may take the form of a database or other common forms for storing data. The data lake may also, in one or more embodiments of the invention be stored on one or more public clouds, public datacenter, and private datacenters, as well as the one or more datacenters (e.g., 110A-110N).

The one or more datacenters (e.g., 110A-110N) may include physical storage or logical/virtual storage (not shown). Additionally, the one or more datacenters (e.g., 110A-110N), may utilize remote storage or resources such as those located externally on a cloud environment, other datacenter (e.g., 110A-110N), or other location. The logical storage devices may utilize any quantity of hardware storage resources of any number of computing devices for storing data. For example, the storage may utilize portions of any combination of hard disk drives, solid state disk drives, tape drives, and/or any other physical storage medium of any number of computing devices.

In one or more embodiments of the invention, the datacenters (e.g., 110A-110N) may host production hosts and/or virtual machines (VMs) that host one or more applications, web services, and/or databases. Each of the datacenters (e.g., 110A-110N) may host any number of production hosts and/or VMs that, in turn, host any number of applications. Each of the datacenters (e.g., 110A-110N) may host or be operatively connected to a plurality of virtual storage devices (not shown). Alternatively, in one or more embodiments of the invention, the virtual storage devices may instead be physical storage devices such as hard disk drive, solid disk drive, tape drives, and or other physical storage mediums of any number of computing devices.

Figure 6:
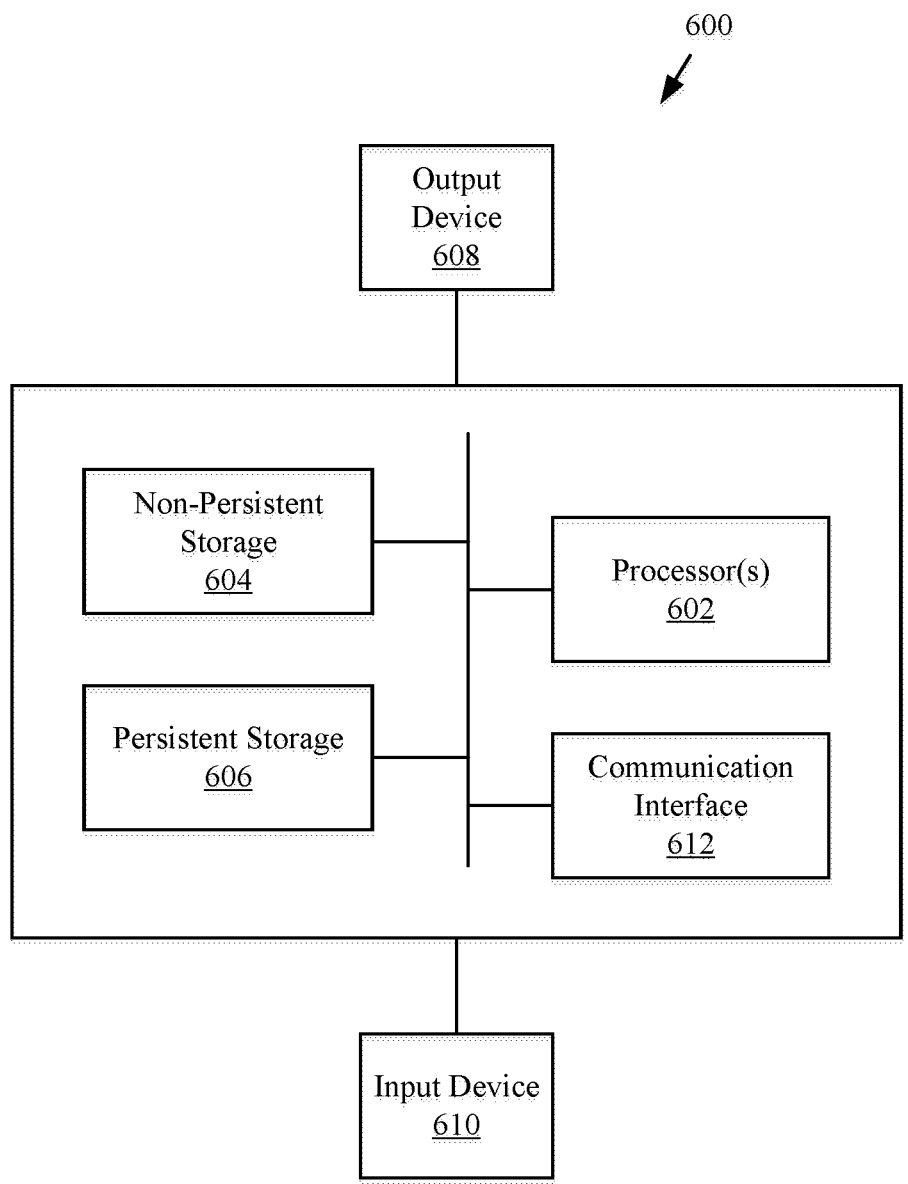
FIG. 6 shows a computing system in accordance with one or more embodiments of the invention.

In one or more embodiments of the invention, the datacenters (e.g., 110A-110N) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the datacenters (e.g., 110A-110N) described throughout this application.

The datacenters (e.g., 110A-110N) may additionally be connected through one or more networks (not shown) as well as the Internet (e.g., 130), to each other, clients (not shown), users (not shown) and other computer systems such as one or more edge environments (not shown) and/or cloud-based storage environments (not shown). Both the datacenters (e.g., 110A-110N) and optional connected edge and cloud-based systems may be public or private (such as an internal or corporate cloud run by the owner of the system shown in FIG. 1A).

In one or more embodiments of the invention, the network allows the local datacenters (e.g., 110A-110N) to communicate with external computing systems including edge environments, cloud environments, other datacenters (e.g., 110A-110N), clients (not shown), and users (not shown). The various components of the datacenter (e.g., 110A-110N) may also communicate with each other through a network which in one or more embodiments may include the Internet (e.g., 130). The network may be a high-speed internal network and/or include part of an external network such as the Internet (e.g., 130).

A network may refer to an entire network or any portion thereof (e.g., a logical portion of the devices within a topology of devices). A network may include a datacenter network, a wide area network (WAN), a local area network (LAN), a wireless network, a cellular phone network, and/or any other suitable network that facilitates the exchange of information from one part of the network to another. A network may be located at a single physical location or be distributed at any number of physical sites. In one or more embodiments, the network may be coupled with or overlap, at least in part, with the Internet.

In one or more embodiments, the network may include any number of devices within any of the components of the system. In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

The one or more datacenters (110A-110N) may communicate over one or more networks using encryption. In one or more embodiments of the invention the individual nodes and/or datacenters may communicate with each other using 128-bit encryption. The individual nodes and/or datacenters may also communicate with clients and users using strong encryption such as 128-bit encryption. Other forms of encryption such as, but not limited to, symmetric-key schemes, public-key schemes, RSA, etc. may be used for communicating between the datacenters, nodes, and other components and entities without departing from the invention.

As will be described in more detail with regards to FIG. 1B, in one or more embodiments of the invention, one or more applications or their instances/context are hosted by one or more of the datacenters (e.g., 110A-110N) and/or the nodes therein. These applications, in one or more embodiments of the invention, perform computer implemented services for clients (not shown) and/or users located on the Internet (e.g., 130). Performing the computer implemented services may include performing operations on assets (applications related data or other data) that are stored in virtual storage devices that are either-part of production hosts making up the datacenters (e.g., 110A-110N). These virtual storage devices may, in one or more embodiments of the invention be in the form of data lakes.

The operations may include creating elements of assets/data, moving elements of assets/data, modifying elements of assets/data, deleting elements of assets/data, and other and/or additional operations on asset data without departing from the invention. The application(s) may include functionality for performing the aforementioned operations on the asset data in the datacenters (e.g., 110A-110N). The application(s) may be, for example, instances of databases, email servers, web-based applications and services, and/or other applications. The datacenters (e.g., 110A-110N) may host other types of applications without departing from the invention.

Figure 1B:
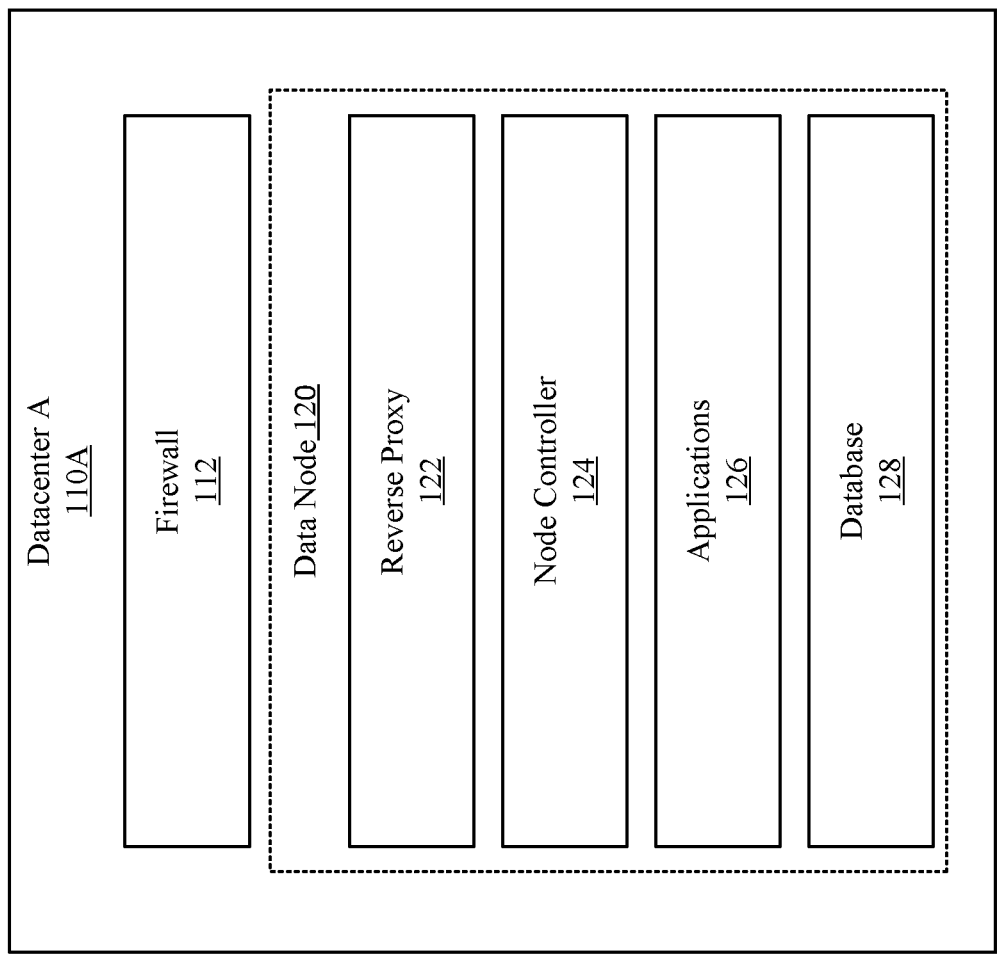
FIG. 1B shows a detailed diagram of a datacenter in accordance with one or more embodiments of the invention.

FIG. 1B shows a diagram of a datacenter (110A) that performs the claimed methods in one or more embodiments of the invention. The datacenter (110A) is similar to the datacenters (e.g., 110A-110N) described above with regards to FIG. 1A. As described above, the datacenter (e.g., 110A) hosts one or more applications and other processes. The datacenter (e.g., 110A) includes one or more processors and other computing devices such as storage devices.

The datacenter (110A) as shown, may include such things as a firewall (112), and one or more nodes (e.g., 120) that include one or more reverse proxies (e.g., 122), node controllers (e.g., 124), applications (e.g., 126), and/or databases (128). The datacenter (110A) may include more or less components then shown in FIG. 1B. Further in one or more embodiments, one or more of these components, such as but not limited to, the nodes (e.g., 120) may be hosted by one or more production hosts (not shown) located on the datacenters (e.g., 110A), these production hosts may be physical computing devices and/or may be one or more virtual machines (not shown).

The datacenter (e.g., 110A) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data. The logical storage devices (e.g., virtualized storage) may utilize any quantity of hardware storage resources of any number of computing devices for storing data. For example, the logical storage device may utilize portions of any combination of hard disk drives, solid state disk drives, tape drives, and/or any other physical storage medium of any number of computing devices.

The datacenter (e.g., 110A) may additionally be connected through a network (not shown) such as the Internet, to one or more other datacenters (e.g., 110A), edge environments and/or cloud-based storage environments. The other datacenters (e.g., 110A-110N) as well as any edge or cloud-based storage environments may be public or private (such as an internal or corporate cloud run by the owner of the datacenter (e.g., 110A)).

As described above the datacenter (e.g., 110A) may connect to the Internet and provide services such as web services and/or database services to the Internet (e.g., 130, FIG. 1A). The datacenter (e.g., 110A) may communicate with the Internet through one or more routers or other similar devices (not shown). The datacenter (e.g., 110A) may include a firewall (112) positioned between the datacenter (e.g., 110A) and the Internet (e.g., 130, FIG. 1A). Alternatively in one or more embodiments of the invention the firewall (112) may be positioned inside the datacenter and there may be more than one.

The firewall (112) may be a separate component or may be part of a network interface/adapter or any other part of the datacenter (e.g., 110A). The firewall (112) monitors and controls incoming and outgoing network traffic, and in one or more embodiments of the invention performs packet filtering. The firewall may include an access control list, filters for specific IP addresses, and other systems for eliminating at least some cyber-security threats. In one or more embodiments of the invention, the firewall works with or includes a reverse proxy (e.g., 114), which will be described in more detail below.

In one or more embodiments of the invention, the datacenter (110A) includes at least one node (e.g., 120). The one or more nodes (e.g., 120) communicate with the Internet (e.g., 130, FIG. 1A) through the firewall (112). The one or more nodes (e.g., 120) may provide web services, applications, and/or access to data stored on one or more databases. The nodes (e.g., 120) may provide other services without departing from the invention.

The data nodes (e.g., 120) may be a physical computing device or may be hosted on one or more virtual machines. The nodes may include such things as one or more reverse proxies (e.g., 122), a node controller (e.g., 124), applications (e.g., 126), and/or databases (e.g., 128). The nodes may include other components without departing from the invention.

In one or more embodiments of the invention, the data nodes (e.g., 120) send messages to each other as well as users and/or other systems through the Internet (130, FIG. 1A). Alternatively, the nodes may send messages to each other through an internal network or private network such as a wide area network (WAN), a local area network (LAN), a wireless network, a cellular phone network, and/or any other suitable network that facilitates the exchange of information from one part of the network to another. A network may be located at a single physical location or be distributed at any number of physical sites. In one or more embodiments, the network may be coupled with or overlap, at least in part, with the Internet.

In one or more embodiments of the invention, messages between data nodes (e.g., 120) as well as any messages or requests from external entities, pass through the firewall (112) and/or other components of the datacenter (110A). A reverse proxy (114) may receive the messages form the firewall and forward them to the appropriate component of the node (e.g., 120) and/or forward it to another node (e.g., 120) as appropriate.

In one or more embodiments of the invention, the reverse proxy (122) may be a part of a cyber-security module (not shown), a part of the firewall (e.g., 112), or a separate part of the datacenter (e.g., 110A). The reverse proxy (122) may be an application or may be part of a hardware device.

In one or more embodiments of the invention each data node (e.g., 120) has its own reverse proxy (122) and when a datacenter (e.g., 110A) includes more than one data node (e.g., 120), each datacenter (e.g., 110A) may include a plurality of reverse proxies (e.g., 122). Alternatively in one or more other embodiments of the invention, the reverse proxy (122) may be separate from the data node and may serve one or more data nodes (e.g., 120) located in the datacenter (110A). Other combinations of firewalls (e.g., 112), reverse proxies (e.g., 122) and data nodes (e.g., 120), may be used without departing from the invention, including in one or more embodiments of the invention where the data node (e.g., 120) communicates with the internet and/or firewall without the use of a reverse proxy (e.g., 122).

The reverse proxy (122) functions in concert with the firewall to provide additional protection to the applications and/or databases hosted by the datacenter (e.g., 110A) in the data nodes (e.g., 120). The reverse proxy (122) may sort any incoming request from the Internet to the appropriate application (e.g., 126) such as, but not limited to, a web application and/or database (e.g., 128). Those requests that are not authorized may be discarded or sent to an appropriate cyber security module (not shown). In one or more embodiments of the invention the reverse proxy (122) analyzes the content of each packet such as the packet's headers and other content to determine if the packet is legitimate or the result of a cyber-attack, as well as determining which component or application (e.g., 126) of the data node (e.g., 120) or datacenter (e.g., 110A) should receive the packet.

In one or more embodiments of the invention, the reverse proxy (122) in concert with the node controller (124) may perform the methods described below with regards to the methods shown in FIGS. 2-4. The node controller (124) along with the reverse proxy (122) may include rules in the form of JSON or XML instructions for determining which nodes are active and which nodes are inactive. The instructions may also determine which node or how each node should reply to any requests received from the Internet.

In one or more embodiments of the invention, the primary or initially activated node is designated as an alpha node while the remaining, secondary, and/or standby nodes are designated as beta nodes. The use of the terms alpha node and beta nodes is only for purposes of explanation and the invention is not limited to these terms for the various nodes. In one or more embodiments of the invention, only the alpha node responds to requests while the one or more beta nodes are in standby. In one or more other alternative embodiments of the invention, the alpha node choses which node is geographically or most suited to serve a particular Internet request, and if any of the nodes (alpha or beta) may respond to a request as is most efficient or based on other rules established by a user and/or administrator.

As described in more detail below, the node controller (124) either alone or in combination with the reverse proxy (122) may include instructions for determining which node serves as an alpha node and which node(s) serve as beta nodes. In one or more embodiments of the invention when one or more nodes (e.g., 120) are initiated, the order that the nodes are initiated is recorded in one or more databases (e.g., 128) associated with each node (e.g., 120). Periodically, using encrypted messages, each beta node sends status signals to the alpha node which replies with an acknowledgement signal. If one or more nodes goes offline including the alpha node, in accordance with one or more rules, the plurality of nodes re-establish which nodes are alpha nodes and beta nodes as described more below with regards to the methods shown in FIGS. 2-4. While being described as being performed by the node controller (124) and reverse proxy (122), the method of FIGS. 2-4 may be performed by other components of the datacenter (e.g., 110A) without departing from the invention.

In one or more embodiments of the invention the one or more data nodes (120) includes applications (126) and/or one or more databases (128). The applications (126) may provide one or more web-based services and/or applications. The applications (126) may additionally, or alternatively provide access to data stored in the one or more databases. In one or more embodiments of the invention, each node (e.g., 120) maintains an identical copy of the applications (126) and/or databases (128). Alternatively, in one or more embodiments of the invention, only a subset or an individual node keeps an updated copy of the one or more applications (126) and/or databases (128) and the other nodes update their copies periodically or when a potential failure of one or more nodes is detected.

In one or more embodiments of the invention, the applications (e.g., 126) and/or databases (e.g., 128) are implemented as computer instructions, e.g., computer code, stored on a persistent storage or virtual storage devices, that when executed by a processor(s) of the datacenters (e.g., 110A) to provide the functionality of the application(s) and/or databases described throughout this application.

In one or more embodiments of the inventions, the data nodes (e.g., 120) and components such as the reverse proxy (e.g., 122), node controller (e.g., 124), applications (e.g., 126), and databases (e.g., 128) datacenters (e.g., 110A-110N) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the data nodes (e.g., 120) as described throughout this application.

While FIGS. 1A and 1B show a configuration of components, other configurations may be used without departing from the scope of embodiments described herein. For example, although FIG. 1A shows all components as part of two devices, any of the components may be grouped in sets of one or more components which may exist and execute as part of any number of separate and operatively connected devices. Accordingly, embodiments disclosed herein should not be limited to the configuration of components shown in FIGS. 1A and 1B.

Figure 2:
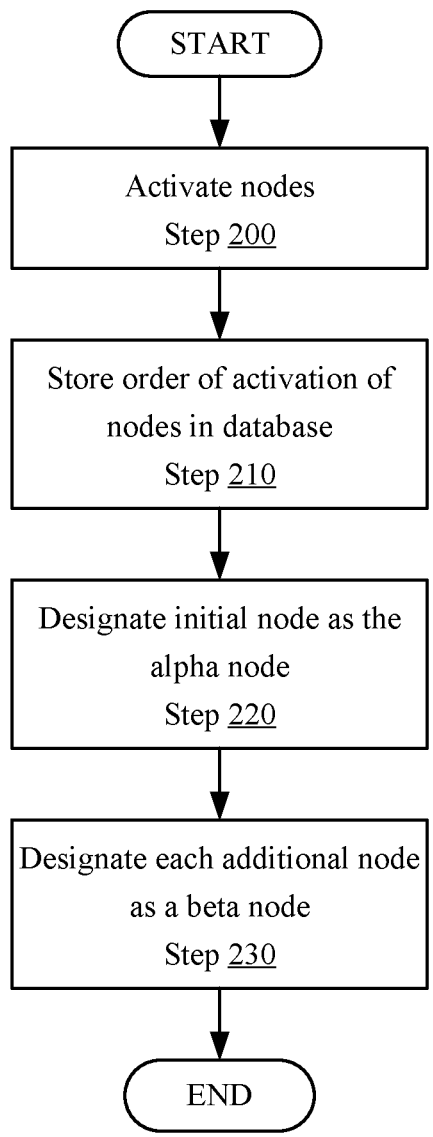
FIG. 2 shows a flowchart of a method for designating alpha and beta nodes in accordance with one or more embodiments of the invention.

FIG. 2 shows a flowchart describing a method for initially activating and determining which nodes (e.g., 120, FIG. 1B) are alpha and beta nodes. The method may be performed, for example, by the reverse proxy (e.g., 122, FIG. 1B), node controller (e.g., 124, FIG. 1B) and/or any other part of the data node (e.g., 120, FIG. 1B) or another portion of the datacenter (e.g., 110A, FIG. 1B).

Other components of the system, including those illustrated in FIGS. 1A and 1B may perform all, or a portion of the method of FIG. 2 without departing from the invention. While FIG. 2 is illustrated as a series of steps, any of the steps may be omitted, performed in a different order, additional steps may be included, and/or any or all the steps may be performed in a parallel and/or partially overlapping manner without departing from the invention.

In step 200, the method begins when one or more of the data nodes (e.g., 120, FIG. 1B) are activated. The nodes may be activated as a response to the system being initially configured, a datacenter (e.g., 110A-110N, FIG. 1A) being brought online, a new application being configured, and/or after maintenance is performed on the one or more datacenters (e.g., 110A-110N, FIG. 1A). When the nodes are activated, each node may send a signal to the other nodes indicating it has been brought online.

Alternatively, or additionally, one node (an alpha node) may have been brought online prior to initiating activation of the other nodes. Then, when each of these nodes activate, they send a signal to the alpha node which then configures the nodes. Other combinations and method for activating the nodes may be performed, including where a user or administrator initially configures multiple nodes and designates their initial order of activation, may be used without departing from the invention.

Once the nodes are activated in step 200, the method proceeds to step 210 where the order of activation of each of the nodes is stored in one or more databases. Alternatively, the order may be stored in a text file or another machine searchable manner that allows for the nodes to easily determine the order that the nodes are activated as well as which nodes are alpha and beta nodes. This order may be stored in databases associated with each node, or it may be stored in a common database that each node has access too. In one or more embodiments of the invention the database may be encrypted or may employ other security means to ensure that only the nodes have access to the information. Alternatively, the databases and/or file may be stored behind a firewall or as a read-only file that may be easily accessed as needed.

Once the order that the nodes were activated in has been stored in the database, the initial node is designated as the alpha node in step 220. Alternatively, a user or administrator could designate a specific node as the alpha node.

As described above, the alpha node administers the order of activation and updates it as needed. Additionally, in one or more embodiments of the invention, the alpha node may service any requests from the Internet, such as outside user requests for information stored in the nodes and/or refer or forward the requests to the appropriate beta node.

In step 230, the one or more other nodes that are not the initial node and/or designated as the alpha node in step 220, are then designated as the beta node. In one or more embodiments of the invention the beta nodes are kept on standby and only provide periodical signaling to the alpha node. In other embodiments, the beta nodes also service requests from the Internet and perform internal signaling coordinated by the alpha node to keep databases and applications up to date.

Once the beta nodes are designated in step 230, the method of FIG. 2 may end.

Figure 3:
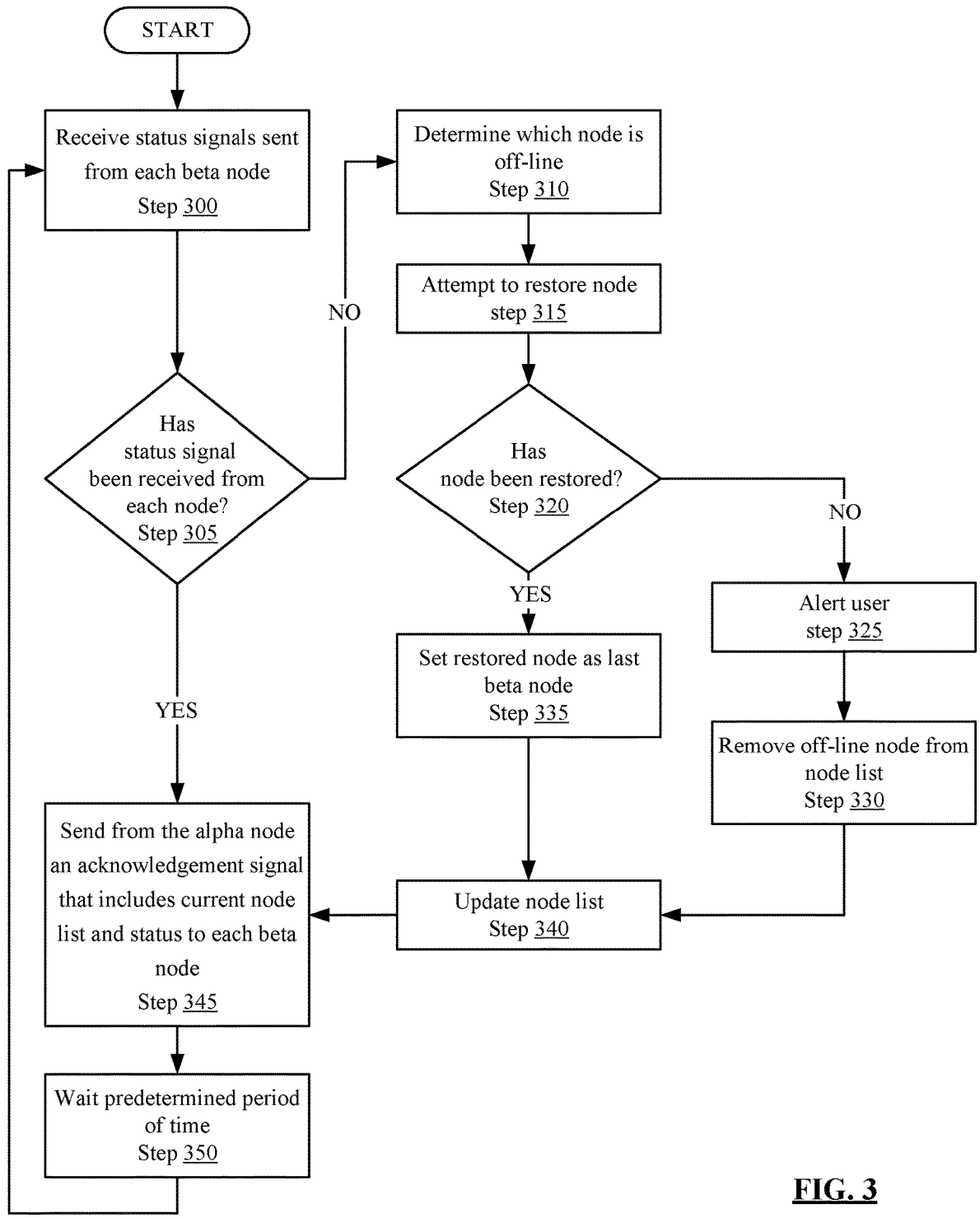
FIG. 3 shows a flowchart of a method for sending and receiving status signals from one or more beta nodes in accordance with one or more embodiments of the invention.

FIG. 3 shows a flowchart describing a method for receiving status signals from the beta nodes by the alpha node. FIG. 3 is described from the perspective of an alpha node. The method may be performed, for example, by the reverse proxy (e.g., 122, FIG. 1B), node controller (e.g., 124, FIG. 1B) and/or any other part of the data node (e.g., 120, FIG. 1B) or another portion of the datacenter (e.g., 110A, FIG. 1B). Other components of the system, including those illustrated in FIGS. 1A and 1B may perform all, or a portion of the method of FIG. 3 without departing from the invention. While FIG. 3 is illustrated as a series of steps, any of the steps may be omitted, performed in a different order, additional steps may be included, and/or any or all the steps may be performed in a parallel and/or partially overlapping manner without departing from the invention.

The method of FIG. 3 begins by receiving a status signal sent from each beta node in step 300. The status signal from each of the beta nodes is received by the alpha node. As described above with regards to the method shown in FIG. 2, the alpha and beta nodes are established during the initial activation of the data nodes and/or one or more datacenters hosting the data nodes. Other methods then those described above with regards to FIG. 2 may be used without departing from the invention.

The status signal from each of the beta nodes may be transmitted through internal networks such as one or more WAN and/or may be transmitted through the Internet using such means as tunneling and/or in secured encrypted packets. The status signal in one or more embodiments of the invention is sent from each of the beta nodes to the alpha node using 128-bit encryption, however, other types of encryption may be used without departing from the invention.

Once status signals sent from each beta node are received in step 300, the method proceeds to step 305, where it is determined by the alpha node that a status signal has been received from each node. If a status signal is received, the method proceeds to step 345; otherwise, if in step 305 it is determined that a status signal was not received from one or more nodes, the method proceeds to step 310.

Alternatively, in one or more embodiments of the invention if the status signal received from one or more of the beta nodes that indicates that the beta node is about to go offline, the node may be considered offline, and the method proceeds to step 310 as well. This may occur, for example (in a non-limiting example), when a datacenter hosting the node determines that the node is about to fail, or a user or administrator instructs the datacenter to take the node offline. When this determination is made, a special status signal, sent to the alpha node, may indicate that the node is about to go offline.

In step 310, the method determines which node or nodes are offline. The node or nodes is considered to be offline if the status signal was not received from the node or if a beta node had sent a message indicating that it will be going offline. Either after a preset period of time or predetermined number missed status signals when no status signal is received from a beta node, or after receiving a message indicating that a beta node will be going offline, the beta node will be considered to be offline in step 310.

The alpha node will then determine in step 310 which beta node(s) is offline, by comparing the status signals that were received with those that were expected. In one or more embodiments of the invention, the alpha node may send a second message to the beta node, to determine that the beta node is offline or if the status signal was not received for another reason. Once one or more beta nodes are determined to be offline in step 310, the method proceeds to step 315, where the alpha node attempts to restore the one or more beta nodes.

In one or more embodiments of the invention, the alpha node in step 315 attempts to restore the one or more beta does that were determined to be offline in step 310. The alpha node may send messages to the datacenter (e.g., 110A-110N, FIG. 1A) that host the particular beta node(s), instructing the datacenter to attempt to restart the offline beta node(s). The alpha node may alternatively or in addition perform other actions as configured by a user or administrator that may restore the offline node that is appropriate for the configuration of the system.

The method then proceeds to step 320, where the alpha node determines if the beta node(s) has been restored. If the beta node(s) has been restored (such as, in one non-limiting example, would be indicated by receiving a status signal from the beta node(s)), the method proceeds to step 335. If the alpha node is unsuccessful in restoring the beta node the method proceeds to step 325.

In step 325, the alpha node or other component of the system notifies a user, administrator, manufacturer, and/or other concerned party that the beta node has gone offline. This may include displaying an alert on the appropriate user's workstation and/or sending emails, SMS, or other messages as appropriate. Alternatively, where, for example, the user had taken the node offline step 325 may be skipped.

Once the user or other concerned party is notified, the method then proceeds to step 330 where the offline node is removed from the node list maintained by the alpha node and the method proceeds to step 340 where the node list is updated. Alternatively in step 320, if the node is restored, the restored node in step 335 is moved to the last position on the node list and/or treated as the last node to be activated. The node list is updated in step 340.

Once the method either receives a status signal from each node in step 305 or the node list is updated in step 340, the method proceeds to step 345. In step 345, an acknowledgement signal is sent to each of the beta nodes from the alpha node. This acknowledgement signal includes the current node list, which may be the updated node list from step 340. When the beta nodes receive the acknowledgement signal, they update their node lists to include the newest order of activation for the nodes. While in one or more embodiments of the invention the acknowledgement signal only includes the node list and status of each beta node, the signal may include more or less information without departing from the invention.

Once the acknowledgement signal is sent by the alpha node in step 345, the method proceeds to step 350. In step 350, the method waits a predetermined time that is configured by the user, administrator and/or manufacturer for waiting before the method repeats and proceeds back to step 300. The method of FIG. 3 continues to operate until such a time that the nodes are no longer needed and/or a user/administrator specifies that the method should end.

Figure 4:
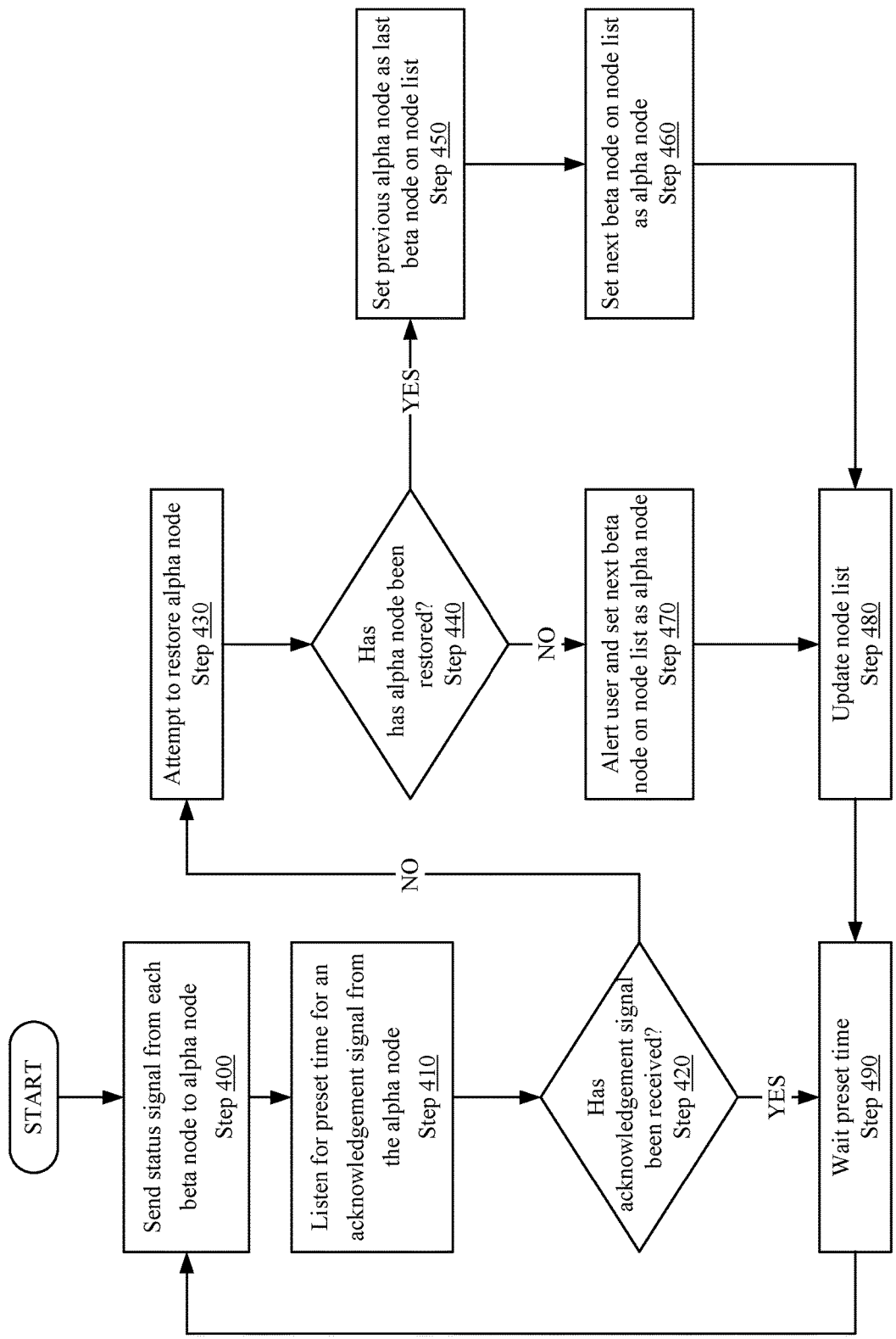
FIG. 4 shows a flowchart of a method for sending and receiving acknowledgement signals from an alpha node in accordance with one or more embodiments of the invention.

FIG. 4 shows a flowchart describing a method for receiving acknowledgement signals from an alpha node by one or more beta nodes. FIG. 4 is described from the perspective of a beta node. The method may be performed, for example, by the reverse proxy (e.g., 122, FIG. 1B), node controller (e.g., 124, FIG. 1B) and/or any other part of the data node (e.g., 120, FIG. 1B) or another portion of the datacenter (e.g., 110A, FIG. 1B). Other components of the system, including those illustrated in FIGS. 1A and 1B may perform all, or a portion of the method of FIG. 4 without departing from the invention. While FIG. 4 is illustrated as a series of steps, any of the steps may be omitted, performed in a different order, additional steps may be included, and/or any or all the steps may be performed in a parallel and/or partially overlapping manner without departing from the invention.

The method of FIG. 4 begins by having each of the beta nodes send a status signal to the alpha node in step 400. As described above with regards to the method shown in FIG. 2, the alpha and beta nodes are established during the initial activation of the data nodes and/or one or more datacenters hosting the data nodes. Other methods then those described above with regards to FIG. 2 may be used without departing from the invention.

The status signal from each of the beta nodes may be transmitted through internal networks such as one or more WAN and/or may be transmitted through the Internet using such means as tunneling and/or in secured encrypted packets. The status signal in one or more embodiments of the invention is sent from each of the beta nodes to the alpha node using 128-bit encryption, however, other types of encryption may be used without departing from the invention.

Once status signals sent from each beta node are received in step 400, the method proceeds to step 410, where each of the beta nodes listens for an acknowledgement signal from the alpha node. The acknowledgement signal is sent to each of the beta nodes from the alpha node. This acknowledgement signal includes the current node list and may include any other information that is useful or has been configured for the alpha node to relay to the beta nodes. When the beta nodes receive the acknowledgement signal, they update their node lists to include the newest order of activation for the nodes. While in one or more embodiments of the invention the acknowledgement signal only includes the node list and status of each beta node, the signal may include more or less information without departing from the invention.

Once the beta nodes have listened for the acknowledgement signal over a predetermined period of time, the method proceeds to step 420. If it is determined by the beta node that an acknowledgement signal has been received by from the alpha node, the method proceeds to step 490. However, if no acknowledgement signal is received after a predetermined amount of time, the method proceeds to step 430. The predetermined amount of time that each beta node waits to receive an acknowledgement signal may be configured by the user, administrator, manufacturer, and/or other concerned party. Alternatively, the beta nodes may send a preset number of status signals without receiving a response.

In one or more embodiments of the invention, alternatively, the alpha node may send a signal indicating that it is failing and/or going offline. Once such a message is received by the beta nodes, the alpha node may be considered to be offline, and the method proceeds to step 430 as well. This may occur, for example (in a non-limiting example), when a datacenter hosting the alpha node determines that the node is about to fail, or a user or administrator instructs the datacenter to take the alpha node offline. When this determination is made, a special status signal, sent to the beta nodes, may indicate that the node is about to go offline.

In one or more embodiments of the invention, the beta nodes in step 430 attempt to restore the one or more alpha nodes that was determined to be offline in step 420. The beta nodes may send messages to the datacenter (e.g., 110A-110N, FIG. 1A) that hosts the particular alpha node, instructing the datacenter to attempt to restart the offline alpha node. The beta node may alternatively or in addition perform other actions as configured by a user or administrator that may restore the offline alpha node that is appropriate for the configuration of the system.

The method then proceeds to step 440, where the beta node(s) determine if the alpha node has been restored. If the alpha node has been restored (such as, in one non-limiting example, would be indicated by receiving a status signal or other signal from the alpha node), the method proceeds to step 450. If the beta node is unsuccessful in restoring the alpha node the method proceeds to step 470.

In step 450 the newly restored alpha node is designated as a beta node and moved to the last beta node on the node list. This list is then distributed to all of the beta nodes by the new alpha node which is set in step 460. In step 460 the next node on the node list stored in the databases associated with the nodes, is set as the alpha node. This should be the second node that was activated initially or at least the node that has been active the greatest amount of time. One or more other rules for determining which beta node should be set as the new alpha node may be used as configured by a user, administrator, manufacture, and/or other concerned party. Once the new alpha node is established in step 460 the method proceeds to step 480.

Alternatively, if the previous alpha node is determined in step 440 to have not been restored the method proceeds to step 470. In step 470, one or more of the beta nodes notifies a user, administrator, manufacturer, and/or other concerned party that the alpha node has gone offline. This may include displaying an alert on the appropriate user's workstation and/or sending emails, SMS, or other messages as appropriate.

Once the user or other concerned party is notified the next node on the node list stored in the databases associated with the nodes, is set as the alpha node. This should be the second node that was activated initially or at least the node that has been active the greatest amount of time. One or more other rules for determining which beta node should be set as the new alpha node may be used as configured by a user, administrator, manufacture, and/or other concerned party. Once the new alpha node is established in either steps 460 or 470 the method proceeds to step 480.

In step 480, the new alpha node sends a message or signal to each of the beta nodes with the updated node list as determined either in step 460 or 470. The updated list is received by each of the other nodes and the copies of the node lists stored on the databases associated with each of the nodes is updated.

Once the updated node list is produced in step 480 and sent to the beta nodes, the method proceeds to step 490. Alternatively, if an acknowledgement signal is received in step 420, the method also proceeds to step 490 after step 420. In step 490 the method waits a predetermined time that is configured by the user, administrator and/or manufacturer for waiting before the method repeats and returns back to step 400. The method of FIG. 4 continues to operate until such a time that the nodes are no longer needed and/or a user/administrator specifies that the method should end.

Example

Figure 5A:
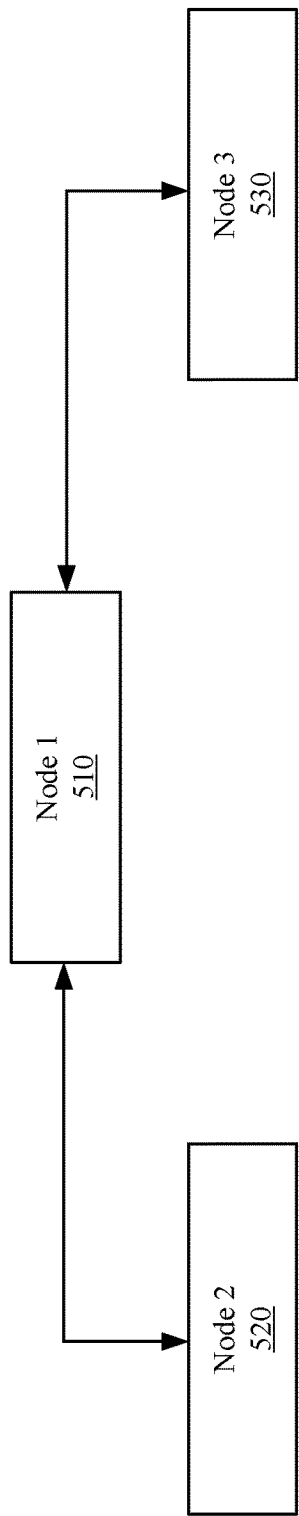
FIGS. 5A and 5B show examples of a configuration of three nodes in accordance with one or more embodiments of the invention.
Figure 5B:
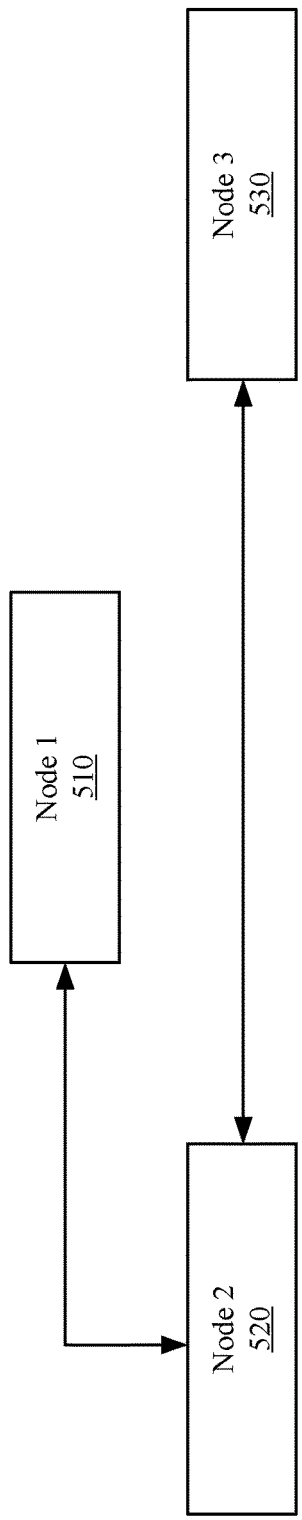

FIGS. 5A and 5B shows a non-limiting example of a system that performs the methods described above in FIGS. 2-4. The example is not intended to limit the scope of the claims. The system in the example, in accordance with one or more embodiments of the invention, comprises three nodes (510-530), however, more nodes such as 10, 100, 1000, or more, etc. may be used without departing form the invention.

Each node communicates with each other through an internal network, while each node also communicates with the Internet or other external network through one or more firewalls and/or reverse proxies. In the arrangement shown in FIG. 5A, node 1 (510) is the first node to be established while nodes 2 and 3 (520 and 530) are established in that order. Other order of establishing the nodes may be used without departing from the invention, and the above order is provided purely as a non-limiting example.

The first node to be established, node 1 (510) is set as the alpha node, while nodes 2 and 3 (520 and 530) are established as beta nodes. Periodically, for example, once every minute, 5 minutes, hour, day, or other predetermined period of time, the beta nodes 2 and 3 (520 and 530) send out status signals to the alpha, node 1 (510). In response, the alpha node sends an acknowledgement signal. If no acknowledgement signal is received a new alpha node is established (node 2, 520) as will be described with regards to FIG. 5B.

Returning to FIG. 5A, if, for example, node 2 (520), fails to send a status signal, after a predetermined period of time the alpha node, node 1 (510) attempts to restore node 2 (520). If the alpha node 1 (510) is successful, the node list is updated to have node 3 (530) as the second beta node and node 2 (520) as the third beta node. However, if node 2 (520) is not successfully restored, the alpha node, node 1 (510), notifies a user or administrator as appropriate, and node 2 (520) is removed from the list of available beta nodes.

Turning to FIG. 5B, if the alpha node 1 (510) does not send an acknowledgement signal in a predetermined amount of time, then the next node (node 2, 520) takes its place as alpha node. The new alpha node (node 2, 520) takes over performing the actions of the alpha node and the remaining beta node (node 3, 530), sends the new alpha node (node 2, 520) periodic status signals. When node 1 (510) is restored, it becomes a beta node and is placed at the bottom of the node list.

Other combinations of nodes may use the methods outlined above with regards to the method of FIGS. 2-4 as well as the relationships shown in FIGS. 5A and 5B may be used. The number of nodes and the relationship between them shown in FIGS. 5A and 5B are non-limiting and intended as an example only.

End Example

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many diverse types of computing devices exist, and the aforementioned input and output device(s) may take other forms.

In general, embodiments described herein relate to methods, systems, and non-transitory computer readable mediums storing instructions for maintaining application instances or contexts across a plurality of nodes located on geographically distributed datacenters including those functioning as one or more data lakes. These applications may take the form of web applications and/or databases that are exposed to the Internet. In order to prevent the loss of these applications due to cyber-attacks or due to day-to-day hardware and/or software failures, multiple instances of the applications are maintained as a plurality of nodes that are protected by firewalls and at least one reverse proxy.

By placing applications, database, and web services behind at least one reverse proxy and on multiple nodes, loss of critical data and down time may be minimized when cyber-attacks occur. The redundancy and additional security measures introduced by the one or more embodiments of the invention make any particular tack or system failure less likely to disable all of the instances of the critical applications, database, and web services. This gives these services additional redundancy and resilience.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments may be devised which do not depart from the scope of embodiments as disclosed herein. Accordingly, the scope of embodiments described herein should be limited only by the attached claims.

What is claimed is:

1. A method for performing disaster recovery across a plurality of geographically dispersed nodes, the method comprising:
  recording an order that each of a plurality of nodes is established in one or more databases stored with each of the plurality of nodes;
  designating, based on the recorded order that each of the plurality of nodes is established, a first node to be established as an alpha node and designating the remaining nodes as beta nodes;
  receiving by the alpha node, periodically, from each of the beta nodes, a status signal;
  determining, by the alpha node, that a beta node did not send a status signal; and
  in response to determining that the beta node did not send the status signal:
    performing actions, by the alpha node, to attempt to restore the beta node;
    notifying a user when the actions do not restore the beta node;
    updating the order, wherein the updated order does not include the beta node; and
    sending by the alpha node, to each of the remaining nodes an acknowledgement signal which includes the updated order, wherein each of the remaining beta nodes stores the updated order.

2. The method of claim 1, further comprising:
in response to the alpha node restoring the beta node,
updating, the updated order to generate a second updated order, wherein the second updated order specifies the beta node at an end of the second updated order; and
sending by the alpha node, to each of the beta nodes an acknowledgement signal which includes the second updated order, wherein each of the remaining beta nodes stores the second updated order.

3. The method of claim 1, further comprising:
determining after a preset period, by one or more of the beta nodes, that an acknowledgement signal was not received form the alpha node;
establishing, based on the updated order of the plurality of nodes, a second node to be established as a new alpha node;
sending, from the new alpha node, a second updated order of nodes to each remaining nodes of the plurality of nodes; and
performing actions, by the new alpha node, to attempt to restore the alpha node that did not send an acknowledgement signal.

4. The method of claim 3, wherein when the actions of the new alpha node restore the alpha node, the new alpha node sends an acknowledgement signal to all of the beta nodes with the alpha node designated as a beta node and placed at the end of the recorded order that each of the plurality of nodes is established.

5. The method of claim 3, wherein the action to attempt to restore the alpha node includes notifying a user that the alpha node is down.

6. The method of claim 1, wherein each of the plurality of nodes hosts an instance of a web application.

7. The method of claim 6, wherein each of the web applications communicates with the Internet through a reverse proxy.

8. The method of claim 6, wherein the instances of the web application associated with each of the beta nodes is in standby.

9. The method of claim 1, wherein both the status signals and the acknowledgement signals are encrypted.

10. A non-transitory computer readable medium comprising computer readable program code, which when executed by a computer processor enables the computer processor to perform a method for performing disaster recovery across a plurality of geographically dispersed nodes, the method comprising:
recording an order that each of a plurality of nodes is established in one or more databases stored with each of the plurality of nodes;
designating, based on the recorded order that each of the plurality of nodes is established, a first node to be established as an alpha node and designating the remaining nodes as beta nodes;
receiving by the alpha node, periodically, from each of the beta nodes, a status signal;
determining, by the alpha node, that a beta node did not send a status signal; and
in response to determining that the beta node did not send the status signal:
performing actions, by the alpha node, to attempt to restore the beta node;
notifying a user when the actions do not restore the beta node;
updating the order, wherein the updated order does not include the beta node; and
sending by the alpha node, to each of the remaining nodes an acknowledgement signal which includes the updated order, wherein each of the remaining beta nodes stores the updated order.

11. The non-transitory computer readable medium of claim 10, further comprising:
in response to the alpha node restoring the beta node,
updating, the updated order to generate a second updated order, wherein the second updated order specifies the beta node at an end of the second updated order; and
sending by the alpha node, to each of the beta nodes an acknowledgement signal which includes the second updated order, wherein each of the remaining beta nodes stores the second updated order.

12. The non-transitory computer readable medium of claim 10, further comprising:
determining after a preset period, by one or more of the beta nodes, that an acknowledgement signal was not received form the alpha node;
establishing, based on the updated order of the plurality of nodes, a second node to be established as a new alpha node;
sending, from the new alpha node, a second updated order of nodes to each remaining nodes of the plurality of nodes; and
performing actions, by the new alpha node, to attempt to restore the alpha node that did not send an acknowledgement signal.

13. The non-transitory computer readable medium of claim 12, wherein when the actions of the new alpha node restore the alpha node, the new alpha node sends an acknowledgement signal to all of the beta nodes with the alpha node designated as a beta node and placed at the end of the recorded order that each of the plurality of nodes is established.

14. The non-transitory computer readable medium of claim 12, wherein the action to attempt to restore the alpha node includes notifying a user that the alpha node is down.

15. The non-transitory computer readable medium of claim 10, wherein each of the plurality of nodes hosts an instance of a web application.

16. The non-transitory computer readable medium of claim 15, wherein each of the web applications communicates with the Internet through a reverse proxy.

17. The non-transitory computer readable medium of claim 15, wherein the instances of the web application associated with each of the beta nodes is in standby.

18. A system comprising:
a plurality of geographically dispersed nodes which comprise:
at least one firewall;
at least one reverse proxy;
at least one processor; and
at least one memory that includes instructions, which when executed by the at least one processor, performs a method for performing disaster recovery across the plurality of geographically dispersed nodes, the method comprising:
recording an order that each of a plurality of nodes is established in one or more databases stored with each of the plurality of nodes;
designating, based on the recorded order that each of the plurality of nodes is established, a first node to be established as an alpha node and designating the remaining nodes as beta nodes;

receiving by the alpha node, periodically, from each of the beta nodes, a status signal;

determining, by the alpha node, that a beta node did not send a status signal; and in response to determining that the beta node did not send the status signal:

performing actions, by the alpha node, to attempt to restore the beta node;

notifying a user when the actions do not restore the beta node;

updating the order, wherein the updated order does not include the beta node; and sending by the alpha node, to each of the remaining nodes an acknowledgement signal which includes the updated order, wherein each of the remaining beta nodes stores the updated order.

19. The system of claim 18, wherein the method further comprises:

in response to the alpha node restoring the beta node, updating, the updated order to generate a second updated order, wherein the second updated order specifies the beta node at an end of the second updated order; and sending by the alpha node, to each of the beta nodes an acknowledgement signal which includes the second updated order, wherein each of the remaining beta nodes stores the second updated order.

20. The system of claim 18, wherein the method further comprises:

determining after a preset period, by one or more of the beta nodes, that an acknowledgement signal was not received form the alpha node;

establishing, based on the updated order of the plurality of nodes, a second node to be established as a new alpha node;

sending, from the new alpha node, a second updated order of nodes to each remaining nodes of the plurality of nodes; and performing actions, by the new alpha node, to attempt to restore the alpha node that did not send an acknowledgement signal.

* * * * *